United States Patent
Chol et al.

(10) Patent No.: US 8,923,934 B2
(45) Date of Patent: Dec. 30, 2014

(54) DUAL DISPLAY FOLDER TYPE TERMINAL

(75) Inventors: Hyok Su Chol, Seoul (KR); Tomohiro Harata, Seoul (KR); Sung Hoon Hong, Seoul (KR); Dong Hun Kim, Seoul (KR); Pil Won Kim, Seoul (KR); Dong Kyun Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/190,707

(22) Filed: Jul. 26, 2011

(65) Prior Publication Data

US 2012/0129581 A1    May 24, 2012

(30) Foreign Application Priority Data

Nov. 18, 2010 (KR) .................. 10-2010-0114934

(51) Int. Cl.
*H04M 1/00* (2006.01)
*H04M 1/02* (2006.01)

(52) U.S. Cl.
CPC ........ *H04M 1/0218* (2013.01); *H04M 2250/16* (2013.01)
USPC ..................................... 455/575.3

(58) Field of Classification Search
USPC ............ 455/575.1, 575.3, 575.8, 186.2
See application file for complete search history.

(56) References Cited

U.S. PATENT DOCUMENTS

| | | | |
|---|---|---|---|
| 7,689,244 B2 * | 3/2010 | Kim ........................ | 455/550.1 |
| 2003/0083761 A1 * | 5/2003 | Jacobs et al. .................. | 700/94 |
| 2003/0181228 A1 * | 9/2003 | Kim ........................ | 455/575.3 |
| 2004/0132482 A1 * | 7/2004 | Kang et al. ................ | 455/550.1 |
| 2004/0171405 A1 * | 9/2004 | Amano et al. ............. | 455/556.2 |
| 2004/0224732 A1 * | 11/2004 | Lee et al. ................... | 455/575.3 |
| 2005/0079897 A1 * | 4/2005 | Nishijima et al. ......... | 455/575.1 |
| 2005/0282596 A1 * | 12/2005 | Park et al. ................. | 455/575.3 |
| 2006/0034601 A1 * | 2/2006 | Andersson et al. .......... | 396/157 |
| 2008/0112113 A1 * | 5/2008 | Sawadski et al. ............ | 361/680 |
| 2009/0190295 A1 * | 7/2009 | Chin et al. ............... | 361/679.27 |

FOREIGN PATENT DOCUMENTS

| KR | 2003-073036 | 9/2003 | .............. H04B 1/38 |
|---|---|---|---|
| KR | 2006-033966 | 4/2006 | .............. H04B 1/38 |
| KR | 2006-127717 | 12/2006 | .............. H04B 1/38 |
| KR | 2006-134753 | 12/2006 | .............. H04B 1/38 |

* cited by examiner

*Primary Examiner* — Kwasi Karikari
(74) *Attorney, Agent, or Firm* — Cha & Reiter, LLC

(57) ABSTRACT

A dual display folder type terminal having a hinge includes a manipulation unit formed in the hinge, wherein the inventive implementation of the hinge provides various function commands without the need of an additional space in the terminal. As a result, the size of the terminal doesn't suffer when implementing the manipulation unit. Further, the dual display folder type terminal can operate different modes based on the opening angle of a folder relative to the other folder.

14 Claims, 9 Drawing Sheets

DUAL DISPLAY FOLDER TYPE TERMINAL

CLAIM OF PRIORITY

This application claims the benefit under 35 U.S.C. §119 of a Korean Patent Application filed in the Korean Intellectual Property Office on Nov. 18, 2010 and assigned Serial No. 10-2010-0114934, the entire disclosure of which is hereby incorporated by reference.

BACKGROUND OF THE INVENTION

1. Field of the Invention

The present invention relates to a dual display folder type terminal, and more particularly, to a dual display folder type terminal having an increased use of a hinge area thereof.

2. Description of the Related Art

Nowadays, a folder type terminal such as a mobile phone and a laptop computer that can be selectively folded using a hinge for carrying around.

In a conventional folder type terminal, a hinge is used for folding or sustaining the folder type terminal at an angle. In a dual display folder type terminal having screens formed at both sides thereof, it is difficult to place the manipulation unit while maximizing the display area.

SUMMARY OF THE INVENTION

The present invention has been made in view of the above problems, and provides a dual display folder type terminal that can provide an additive usage of a hinge which in turns helps to and reduce a size of the terminal because addition space of a button is unnecessary. Also, the inventive folder type terminal can be used in various use forms according to an open angle of a folder.

In accordance with an aspect of the present invention, a dual display folder type terminal having a hinge includes a manipulation unit formed in the hinge.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
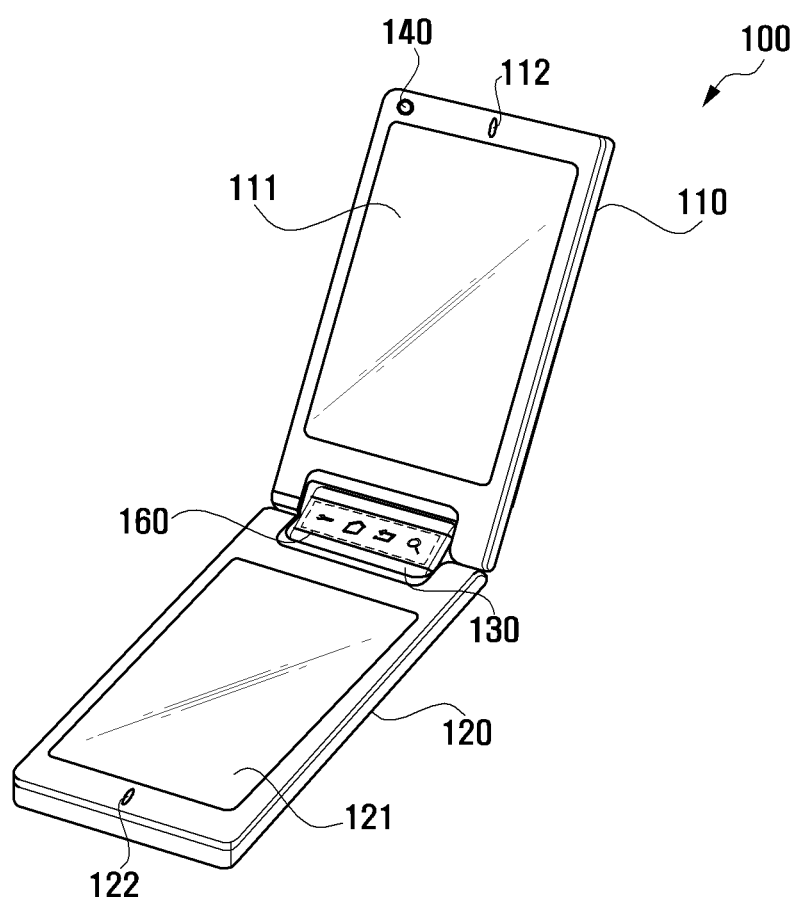
FIG. 1 is a perspective view illustrating a dual display folder type terminal according to a first exemplary embodiment of the present invention.

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. For the purposes of clarity and simplicity, detailed descriptions of well-known functions and structures incorporated herein may be omitted to avoid obscuring the subject matter of the present invention.

Referring to FIGS. 1 to 5, a dual display folder type terminal 100 according to a first exemplary embodiment of the present invention includes a first folder 110, second folder 120, and hinge 130.

As shown, the first folder 110 has a screen 111 at an inner surface (surface positioned at the inside of the dual display folder type terminal 100) and has a speaker 112 and a camera 140 for photographing a picture or a moving picture at one end of the inner surface. The second folder 120 has a screen 121 at an inner surface thereof and a microphone 122. For illustrative purposes, the first folder 110 and the second folder 120 according to the present exemplary embodiment shows a vertical length larger than a horizontal length, as in a general mobile phone, but it should be noted that teachings of the present invention can be applied to other and different orientations of folders.

The hinge 130 is an element for rotatably connecting the first folder 110 and the second folder 120. In the present exemplary embodiment, the hinge 130 may be a 360° gear hinge in which a gear axis (not shown) positioned at the other end of the first folder 110 and a gear axis (not shown) positioned at the other end of the second folder 120. Thus, the first folder 110 and the second folder 120 rotate by around by 360°. A manipulation unit including a first outer manipulation unit 160 and a second outer manipulation unit (side manipulation unit) 150 is formed in the hinge 130.

The first outer manipulation unit 160 is formed in a first outer surface positioned at the inside when the dual display folder type terminal 100 is opened from a closed state. The first outer manipulation unit 160 is formed with four touch keys for illustrative purposes, but may be formed as a button key or with a touch screen, as shown in FIG. 1. The side manipulation unit 150 is formed in a side surface of the hinge 130, as shown in FIGS. 2, 4, and 5, and the side manipulation unit 150 is formed as a button key, but may be formed as a touch key or a touch screen.

Figure 2:
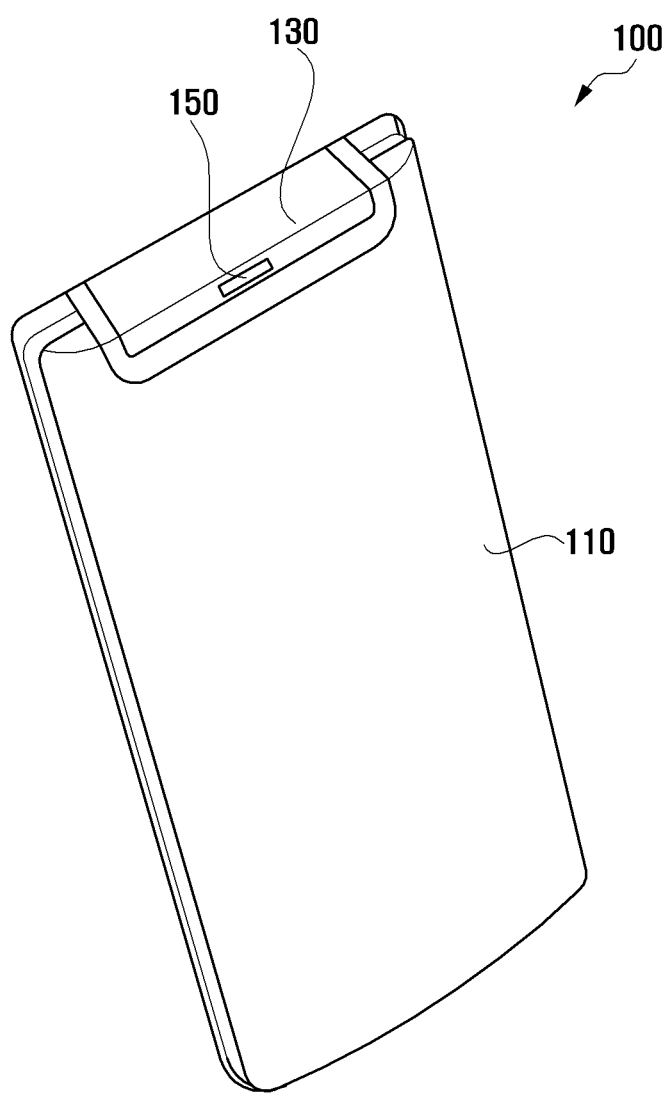
FIG. 2 is a perspective view illustrating a closed state of the dual display folder type terminal of FIG. 1.

When the dual display folder type terminal 100 is in a closed state, the side manipulation unit 150 is exposed to the outside, as shown in FIG. 2. Thus, the side manipulation unit 150 can be manipulated even when the dual display folder type terminal 100 is in a closed state. When the side manipulation unit 150 is formed as a touch screen, simple information can be checked using the side manipulation unit 150.

Figure 3:
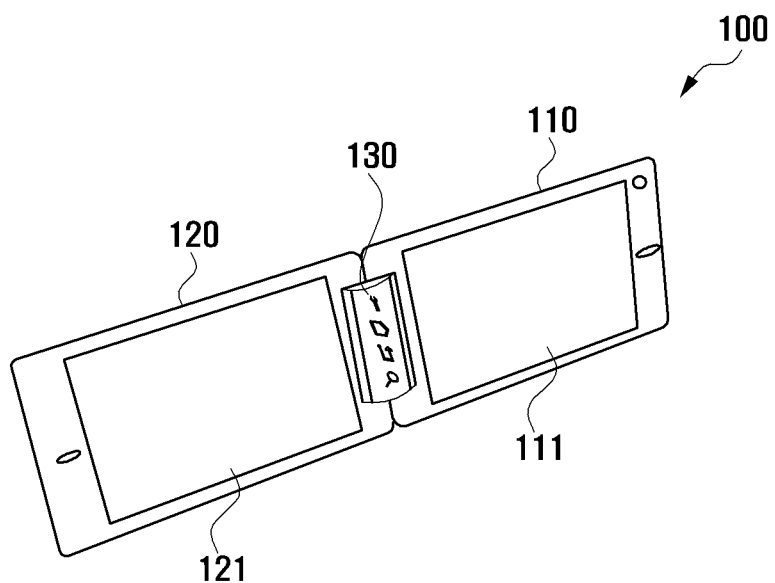
FIG. 3 is a perspective view illustrating a state in which the dual display folder type terminal of FIG. 1 is opened by 180°.

When the dual display folder type terminal 100 is in an open state by 90° to 180°, the user can manipulate the dual display folder type terminal 100 by the first outer manipulation unit 160 disposed at the hinge 130 while performing communication or viewing multi-contents such as a moving picture, as shown in FIGS. 1 and 3.

Figure 4:
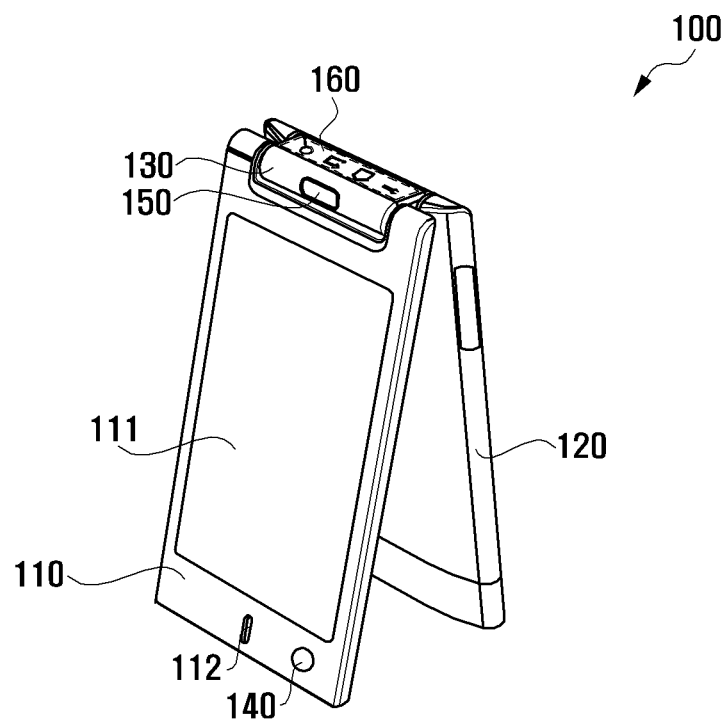
FIG. 4 is a perspective view illustrating a standing state of the dual display folder type terminal of FIG. 1.
Figure 5:
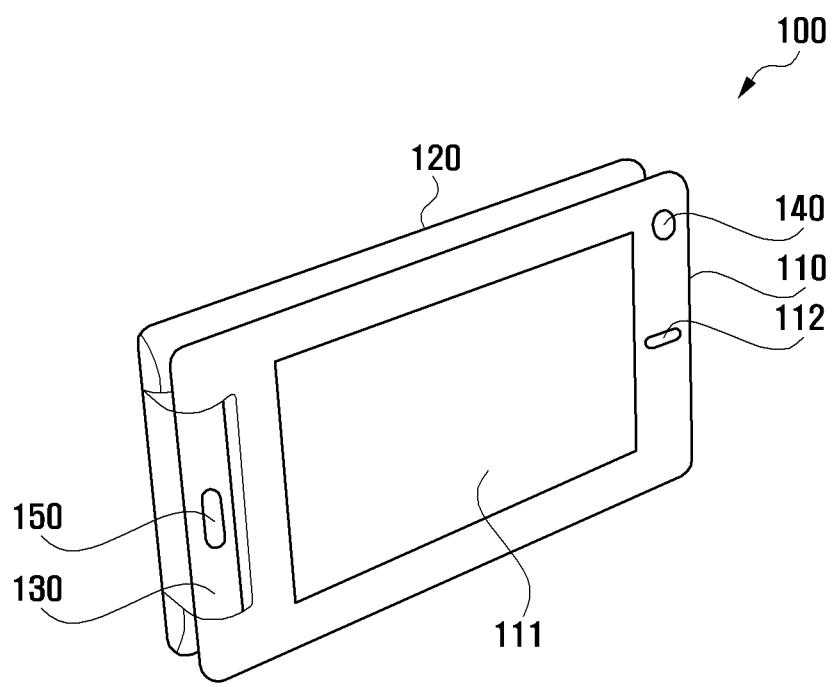
FIG. 5 is a perspective view illustrating a state in which the dual display folder type terminal of FIG. 1 is opened by 360°.

Referring to FIG. 4, when the dual display folder type terminal 100 stands on a table surface with opened by 180° or more, the first outer manipulation unit 160 of the hinge 130 is exposed to the user or easily can be accessed by the user. Accordingly, the dual display folder type terminal 100 can be easily manipulated using the first outer manipulation unit 160 without manipulating the touching a screen while viewing the screen in this standing mode.

Referring to FIG. 5, when the dual display folder type terminal 100 is in an open state by 360°, the side manipulation unit 150 can be used, for example, as a self shooting button or as a function key corresponding to a touch phone.

Figure 6:
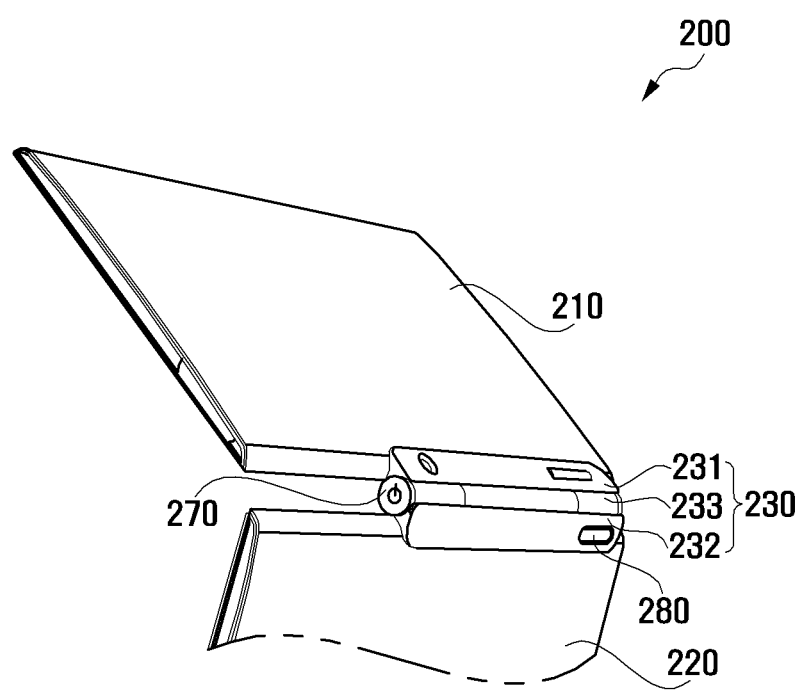
FIG. 6 is a perspective view illustrating a dual display folder type terminal according to a second exemplary embodiment of the present invention.

FIG. 6 is a perspective view illustrating a dual display folder type terminal according to a second exemplary embodiment of the present invention.

Referring to FIG. 6, a dual display folder type terminal 200 according to the second exemplary embodiment has a general hinge structure of rotating a first folder 210 and a second folder 220 which is rotatably coupled by one hinge shaft 233. The hinge 230 includes a first hinge guard 231 for connecting the hinge 230 and the first folder 210, a second hinge guard 232 for connecting the hinge 230 and the second folder 220, and a hinge shaft 233. A hinge shaft manipulation unit 270 is formed at one end surface of the hinge shaft 233, and a hinge guard manipulation unit 280 is formed at an outer surface of the second hinge guard 232. In this embodiment, because the hinge shaft manipulation unit 270 is always exposed to the outside, the hinge shaft manipulation unit 270 can be manipulated regardless of an open angle of the dual display folder type terminal 200. The second embodiment shown in FIG. 6 also includes a manipulation unit (not shown) formed in a outer surface of hinge 230 positioned at the inside when the dual display folder type terminal 200 is opened from a closed state, and further provides different operation modes depending on the opening angle of the folders as in the first embodiment. The dual display folder type terminal 200 according to the second embodiment has the same configuration as that of the first embodiment, except for the above-described configuration, thus discussion of same elements is omitted to avoid redundancy.

Figure 7:
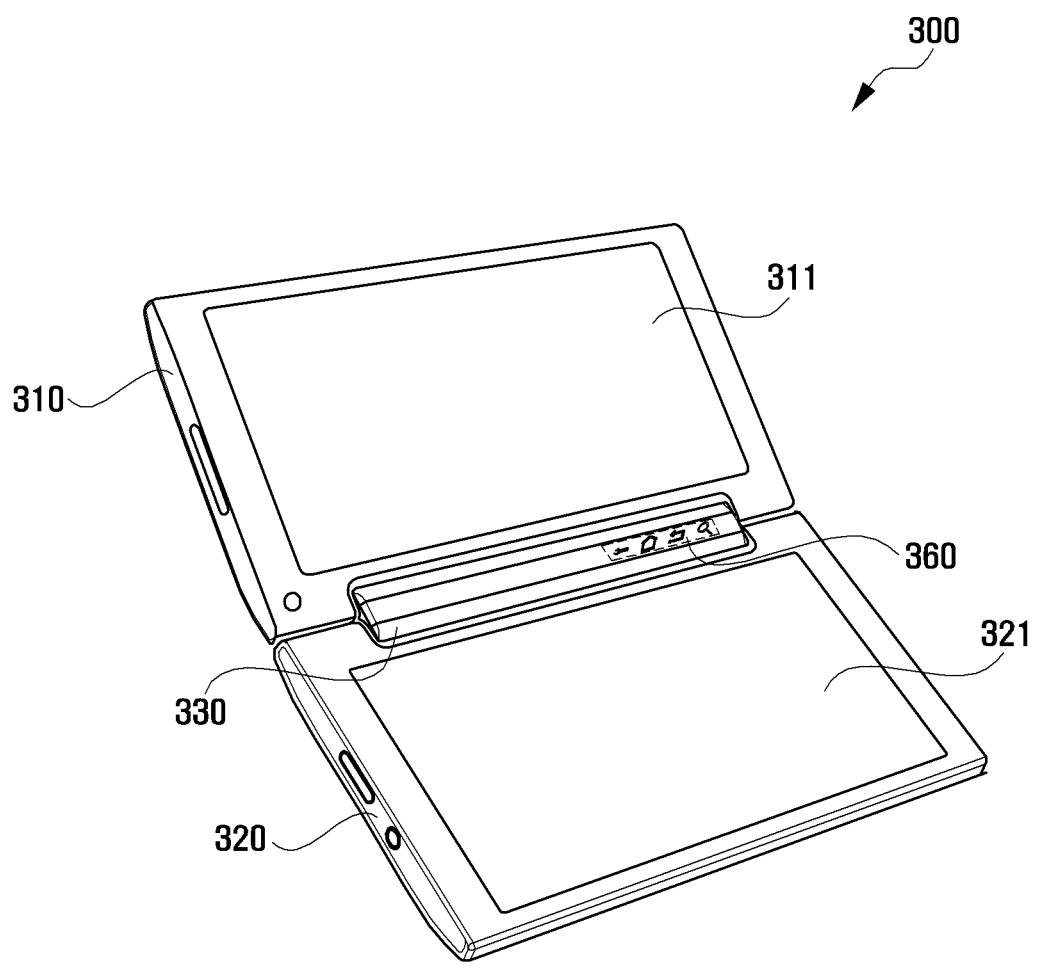
FIG. 7 is a perspective view illustrating a dual display folder type terminal according to a third exemplary embodiment of the present invention.
Figure 8:
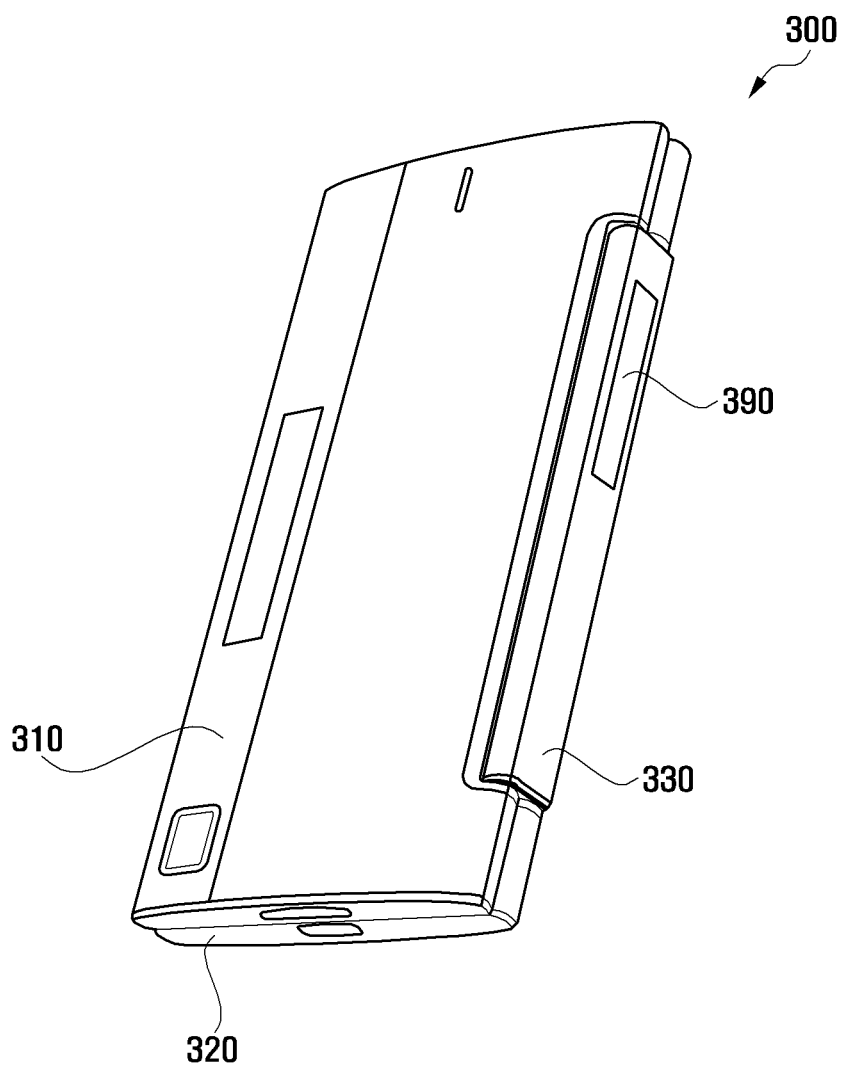
FIG. 8 is a perspective view illustrating a closed state of the dual display folder type terminal of FIG. 7.

Referring to FIGS. 7 and 8, a dual display folder type terminal 300 according to a third exemplary embodiment of the present invention is described.

As shown, the dual display folder type terminal 300 according to the third exemplary embodiment has a first folder 310 and a second folder 320 having a horizontal length larger than a vertical length, as in a laptop computer. A second outer manipulation unit 390 is formed in a second outer surface positioned opposite to a first outer surface of a hinge 330. In this embodiment, because the second outer manipulation unit 390 is formed as a touch screen, the user can check and input simple information through the second outer manipulation unit 390 even when the dual display folder type terminal 300 is in a closed state. The third embodiment shown in FIG. 7 also includes a first manipulation unit (360) formed in a outer surface of hinge 330 positioned at the inside when the dual display folder type terminal 300 is opened from a closed state, and further provides different operation modes depending on the opening angle of the folders as in the first embodiment. The dual display folder type terminal 300 according to the third embodiment has the same configuration as that of the first exemplary embodiment, except for the above-described configuration, thus discussion of same elements are omitted to avoid redundancy.

Figure 9:
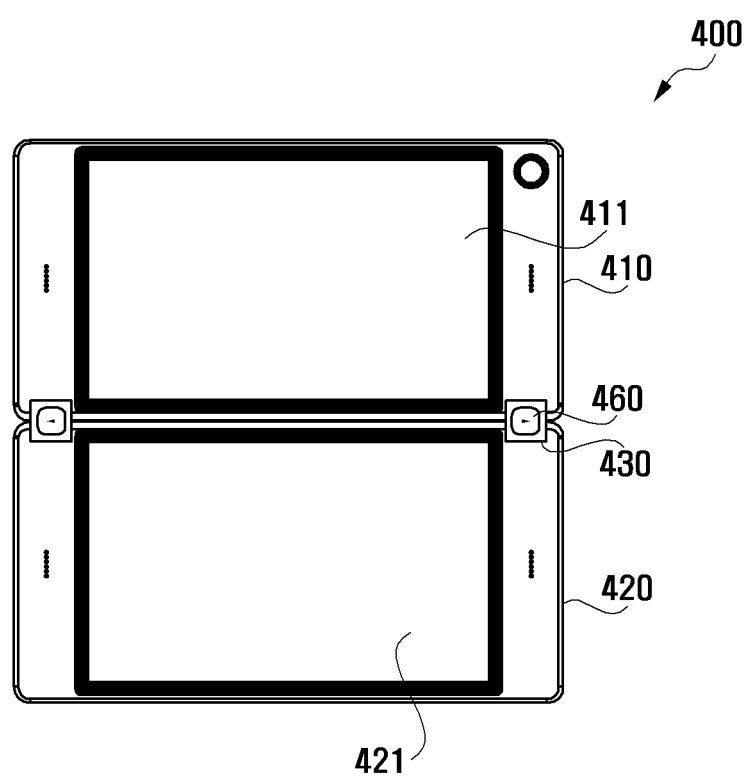
FIG. 9 is a plan view illustrating a dual display folder type terminal according to a fourth exemplary embodiment of the present invention.

Referring to FIG. 9, a dual display folder type terminal 400 according to a fourth exemplary embodiment includes a separate hinge at both ends of the dual display folder type terminal 400. A first outer manipulation unit 460 is formed in an outer surface of the hinge 430. In the fourth embodiment, the first outer manipulation unit 460 is formed as a button key or a touch key. Further, because the first outer manipulation unit 460 is formed in the hinge 430 positioned at both sides of a horizontal direction of the dual display folder type terminal, a user can use a thumb to manipulate the first outer manipulation unit 460 while holding the dual display folder type terminal 400 with both hands. For example, the first outer manipulation unit 460 may be used as a previous/next button or a mode conversion key when reading a book or when listening to music.

As described above, in a dual display folder type terminal according to the present invention, as a manipulation unit is formed in a hinge, thus use of the hinge for command and/or control functions of the terminal is added. As such, an addition space for a button is unnecessary, and thus a size of the terminal can be reduced. Further, the dual display folder type terminal can be used in various use forms and mode of operation with the manipulation unit depending on the opening angle of a folder(s).

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A dual display folder type terminal having a first folder and a second folder each having a screen and coupled by a hinge, comprising:
   a manipulation unit formed in the hinge, the manipulation unit including a plurality of input keys or touch screen elements for providing a plurality of different command functions of the terminal, the manipulation unit comprises:
   a first outer manipulation unit formed in a first outer surface of the hinge positioned at the inside of the dual display folder type terminal when the dual display folder type terminal is opened; and
   a hinge guard manipulation unit for providing at least one command function of the terminal when the dual display folder is in at least a closed position, the hinge guard manipulation unit formed in an outer surface of a hinge guard running alongside the hinge;
   wherein the hinge comprises a cylindrical shaft, and the hinge guard comprises first and second hinge guard portions on opposing sides of the shaft, the first hinge guard portion connecting the hinge and the first folder, the second hinge guard portion connecting the hinge and the second folder.

2. The dual display folder type terminal of claim 1, wherein the manipulation unit further comprises a hinge shaft manipulation unit formed at one end surface of the hinge shaft.

3. The dual display folder type terminal of claim 1, wherein the hinge comprises a 360° gear hinge.

4. The dual display folder type terminal of claim 1, wherein an operation of the terminal varies based on an opening angle of the first folder relative to the second folder of the terminal.

5. The dual display folder type terminal of claim 1, further comprising a speaker at an inner surface of the first folder.

6. The dual display folder type terminal of claim 1, when the dual display folder type terminal is in an open state, the manipulation unit can be accessed during a communication mode or a viewing mode.

7. The dual display folder type terminal of claim 1, further comprising a touch screen provided in the first folder and the second folder.

8. The dual display folder type terminal of claim 7, wherein the dual display folder type terminal can be controlled using the manipulation unit without touching the touch screen during a standing mode.

9. The dual display folder type terminal of claim 1, wherein the manipulation unit formed in the hinge includes the plurality of touch screen elements.

10. A dual display folder type terminal having a first folder and a second folder each having a screen and coupled by a hinge, comprising:
- a manipulation unit formed in the hinge, the manipulation unit including a plurality of input keys or touch screen elements for providing a plurality of different command functions of the terminal;
- wherein the hinge comprises a separation type hinge comprising at least first and second separate hinges provided at opposite ends of the dual display folder type terminal, and the manipulation unit comprises a first outer manipulation unit formed as part of the first hinge, and a second outer manipulation unit formed as part of the second hinge and separated from the first outer manipulation unit.

11. The dual display folder type terminal of claim 10, wherein the manipulation unit is configured as a previous/next button.

12. A dual display folder type terminal having a first folder and a second folder each having a screen and coupled by a hinge, comprising:
- a manipulation unit formed in the hinge, the manipulation unit including a plurality of input keys or touch screen elements for providing a plurality of different command functions of the terminal;
- wherein the hinge comprises a separation type hinge comprising at least first and second separate hinges provided at opposite ends of the dual display folder type terminal, and the manipulation unit is formed as part of at least one of the first and second separate hinges;
- wherein the manipulation unit is configured as a previous/next button during a book reading mode of the terminal, or a mode conversion key.

13. The dual display folder type terminal of claim 12, wherein the manipulation unit is configured as the previous/next button during the book reading mode of the terminal.

14. The dual display folder type terminal of claim 12, wherein the manipulation unit is configured as the mode conversion key during a music playing mode of the terminal.

\* \* \* \* \*

UNITED STATES PATENT AND TRADEMARK OFFICE
CERTIFICATE OF CORRECTION

PATENT NO. : 8,923,934 B2  
APPLICATION NO. : 13/190707  
DATED : December 30, 2014  
INVENTOR(S) : Hyok Su Choi et al.

Page 1 of 1

It is certified that error appears in the above-identified patent and that said Letters Patent is hereby corrected as shown below:

Title page, item (12) should read Choi et al.

Title page, item (75) 1st Inventor should read as follows:
--...Hyok Su Choi, Seoul (KR)...--

Signed and Sealed this  
Thirty-first Day of March, 2015

Michelle K. Lee  
*Director of the United States Patent and Trademark Office*